May 2, 1950 R. C. FERGASON 2,505,952
STALK TOPPING HARVESTER
Filed Dec. 6, 1944 2 Sheets-Sheet 1

Inventor
Rector C. Fergason
by K. S. Wyman
Attorney

May 2, 1950 R. C. FERGASON 2,505,952
STALK TOPPING HARVESTER
Filed Dec. 6, 1944 2 Sheets-Sheet 2
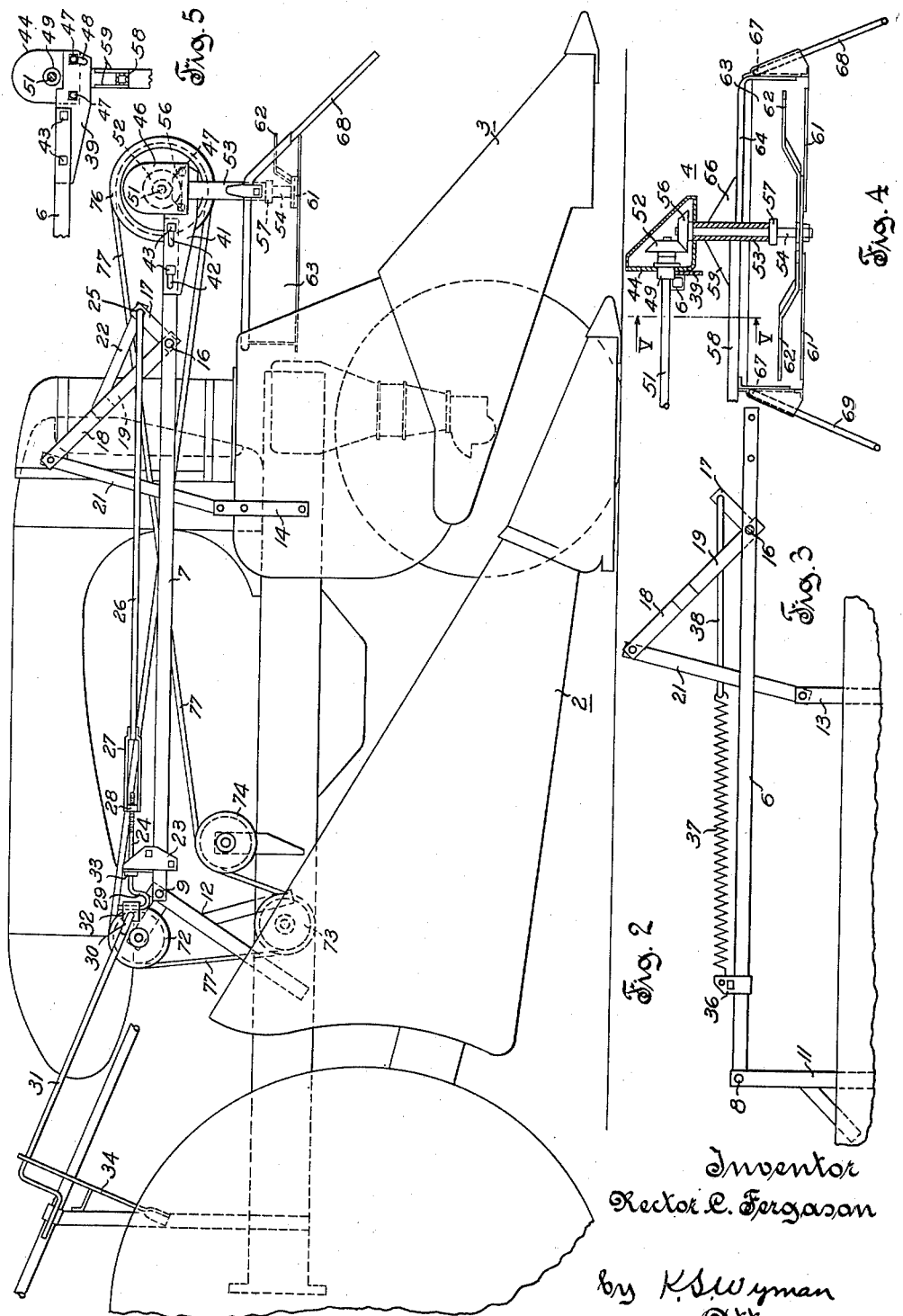
Inventor
Rector C. Fergason
by K. S. Wyman
Attorney Patented May 2, 1950

2,505,952

UNITED STATES PATENT OFFICE 2,505,952

STALK TOPPING HARVESTER

Rector C. Fergason, La Porte, Ind., assignor to Allis-Chalmers Manufacturing Company, Milwaukee, Wis., a corporation of Delaware Application December 6, 1944, Serial No. 566,827

12 Claims. (Cl. 56—15)

This invention relates generally to corn harvesting and more particularly to apparatus for rendering the known types of corn picking harvesters operative under adverse conditions.

For example, one such condition is experienced in picking corn when the ears and stalks are still green as it is practically impossible to snap off the ears with the known types of apparatus without crushing and releasing sap or juice from the stalks in sufficient quantities to produce a condition similar to that experienced when dry stalks become thoroughly wet with rain or melting snow. As a result the wet stalks and particularly the top or tasseled portions thereof, which frequently break off during the ear removing operations, readily adhere to and clog or partially clog the ear snapping and conveying mechanism and as a result a large proportion of the green ears passing through the machine are bruised and thereby rendered unfit for canning purposes, and in addition, the harvester must be frequently stopped and cleaned if picking operations are to be continued.

Therefore, the primary object of this invention is to provide apparatus for rendering corn picking harvesters operative when the corn stalks and ears are in a green or wet condition.

Another object of this invention is to provide a corn picking harvester with apparatus for severing and removing the top portions of corn stalks, weeds, etc. from the path of the picking mechanism.

Another object of this invention is to provide a stalk topping and removing attachment for corn picking harvesters which can be readily secured to and removed from an existing harvester with a minimum of time and effort.

Another object of this invention is to provide a corn picking harvester with a stalk topping and removing apparatus embodying means for elevating and diverting bent-over stalks into the path of the topping and removing elements.

Another object of this invention is to provide a durable and inexpensive stalk topping and removing attachment which can be readily applied to any and all of the known types of corn harvesters.

Still another object of this invention is to provide a stalk topping and removing apparatus for corn picking harvesters which can be readily applied to the known types of harvesters and easily, remotely adjusted for operating on stalks of different height.

The construction, application and operation of apparatus embodying the invention will become readily apparent as the disclosure progresses and particularly points out additional features considered of special importance and of general application although shown and described as applied to a tractor mounted harvester of the type disclosed and claimed in U. S. patent, C. J. Scranton, 2,340,084, granted January 25, 1944.

Accordingly, the invention may be considered as consisting of the various details of construction and combinations of elements including the manner of mounting the apparatus on and adjusting same relative to the harvester as is more fully set forth in the following description and appended claims, reference being also had to the accompanying drawings in which:

Fig. 2 is a view of the right side of the structure shown in Fig. 1;

Fig. 3 is a partial view of the left side of the topping attachment support taken on line III—III of Fig. 1;

Fig. 4 is a partial front view of the left side topping head taken on line IV—IV of Fig. 1 with the gear housing and shaft tube shown in section; and Fig. 5 is a view of the gear housing and its supporting bracket taken on line V—V of Fig. 4.

Figure 1:
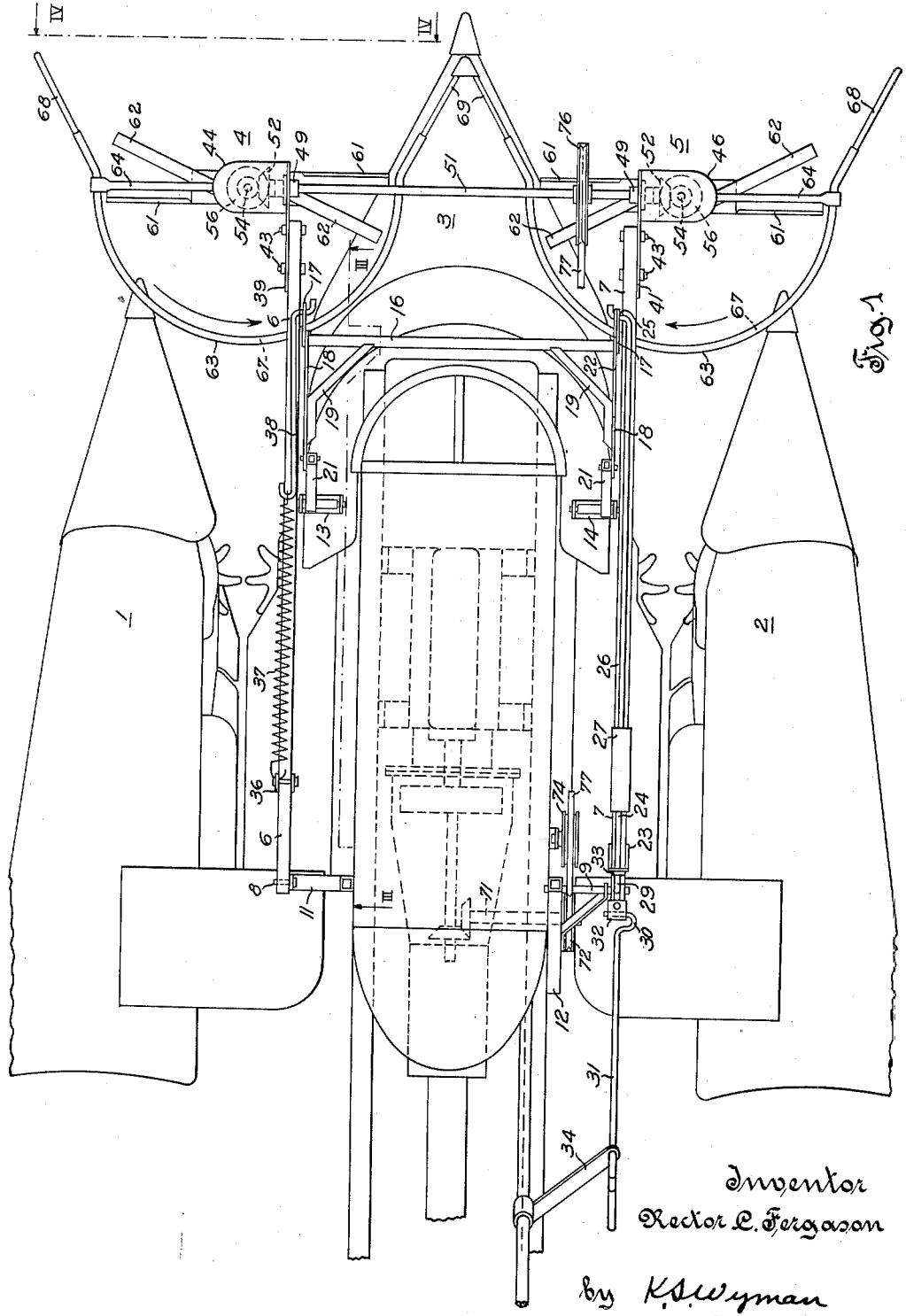
Fig. 1 is a plan view of a tractor mounted two row corn picker embodying the invention.

Referring particularly to Figs. 1 and 2, it is seen that the invention may be applied to a tractor mounted two row corn picker comprising mechanisms designated 1 and 2 disposed in forwardly extending row spaced relation along opposite sides of the tractor for gathering in the stalks and removing the ears therefrom as the tractor travels lengthwise of the rows with its forwardly extending stalk lifter and front wheel shield member 3 disposed approximately midway between a pair of adjacent rows, and that stalk topping apparatus embodying the invention may in this case include a pair of rotary cutter heads or stalk severing devices 4 and 5 carried in stalk topping relation with respect to standing corn in the path of the stalk gathering and ear picking mechanism by means of a pair of substantially rigid, elongated members 6 and 7 mounted on opposite sides of the tractor in forwardly extending relation above the stalk gathering and ear picking mechanisms.

The rear ends of members 6 and 7 are pivotally mounted on horizontally alined pins 8 and 9 carried by substantially rigid, tractor mounted brackets 11 and 12, respectively. The forward end portions of members 6 and 7 are rigidly united by a rigid transverse bar member 16 having its opposite ends pivotally mounted in opposed portions of members 6 and 7 and having a pair of upwardly extending diverging bell crank arms 17 and 18 fixedly secured thereto adjacent each end thereof. A lateral brace member 19 connects each arm 18 with an intermediate portion of bar member 16, and a link 21 pivotally connects the upper end of arm 18 with the upper end of the adjacent one of a pair of tractor mounted brackets 13 and 14. The pair of arms 17 and 18 adjacent the member 7 are provided with an additional brace member 22 connecting the outer end of arm 17 with an intermediate portion of arm 18.

The relation of the bell crank and link assembly and of the rear pivot mountings is such that the members 6 and 7 are united and supported for simultaneous vertical swinging movement both toward and away from the stalk gathering and ear removing mechanisms. The rear end portion of member 7 is provided with a rigid bracket 23 through which passes a link 24 united with a forward extension 26 by means of a turn buckle 27 non-rotatably engaging a nut 28 on the adjacent end of link 24. The forward end of extension 26 is pivotally and non-rotatably connected with bell crank arm 17 at 25 and the rear end of link 24 terminates in a hook portion 29 which is connected with a similar, angularly displaced hook portion 30 on the adjacent end of a rearwardly extending crank 31 by means of a block 32. A forward movement of link 24 is prevented by a nut 33 which engages the rear side of bracket 23. The rear end of crank 31 is rotatably supported in a fixed bracket 34 and the rear or handled end of the crank is preferably disposed within easy reach of the operator of the tractor.

It should now be obvious that a rotation of crank 31 results in a rotation of link 24 and that since nut 28 is non-rotatably held by turn buckle 27, a rotation of link portion 24 relative to extension 26 and turn buckle 27 will effect a longitudinal movement of forward extension 26 relative to portion 24 which in turn effects a pivotal movement of transverse member 16 mounting arms 17 and 18 and of link 21 and thereby, depending upon the direction of rotation, either a raising or lowering swinging movement of the members 6 and 7. Such a movement of members 6 and 7 effects a vertical adjustment of the cutter heads 4 and 5 mounted thereon. In order to prevent a twisting of the assembly comprising united members 6 and 7 and in order to reduce the force required to raise and/or retain same in a selected position, the rear end portion of member 6 (see Fig. 3) is provided with a rigid bracket 36 to which is secured the rear end of a balance spring 37 having its forward end connected with the upper end of the adjacent bell crank arm 17 by means of a link 38.

The forward ends of members 6 and 7 are provided with extension forming brackets 39 and 41 (see also Fig. 5) which are secured to the members 6 and 7, respectively, by means of slotted holes 42 and bolts 43 permitting an adjustment of the brackets longitudinally of the members. The brackets 39 and 41 mount gear housing 44 and 46 each of which is detachably secured to its supporting bracket by means of a pair of bolts 47 one of which passes through an arcuate slot 48. The opposed walls of gear housings 44 and 46 are provided with coaxially alined bearings 49 (see also Fig. 4) in which is rotatably mounted a horizontal shaft 51 having secured to each end thereof a bevel gear 52 disposed within the associated gear housing. Each gear housing 44 and 46 also includes a depending vertical tube 53 in which is rotatably mounted a shaft element or the like 54 having at its upper end a bevel gear 56 which is in mesh with gear 52 on the adjacent end of horizontal shaft 51. Shaft 54 is held against vertical movement relative to tube 53 by means of a collar 57 and the hub portion of gear 56. The vertically depending tube portions 53 of gear housing 44 and 46 are bracedly interconnected by a rigid cross member 58 which may be secured to opposed intermediate portions of tubes 53 in any suitable manner such as by means of a pair of gusset plates 59 and welds (not shown).

The lower end of each vertical shaft 54 has secured thereto a pair of oppositely, radially extending stalk cutters or knife blades 61 and a pair of oppositely, radially extending fingers 62 which are disposed above and in angularly displaced relation with respect to the associated knife blades. The rear side of each cutter head comprising a pair of knife blades 61 is enclosed by a vertically disposed, semi-cylindrical shield 63 having one end secured to the underside of cross member 58 (see Fig. 4) and having its opposite end secured to a bar 64 which may be secured to tube 53 in any suitable manner, such as by a gusset plate 66 and welds (not shown), and projects radially outward therefrom in alinement with cross member 58. The shields 63 may be reinforced by having their upper edges rolled over a rod 67 which extends forwardly and downwardly beyond the front edges of the shields to provide outer portions 68 and an intermediate portion 69 (see Figs. 1, 2 and 4) positioned to raise bent over stalks into the path of the cutting blades.

The tractor is provided with an engine driven shaft 71 on which is mounted a driving pulley or like power transmitting element 72 and with a pair of idler pulleys 73 and 74 alined with each other and with driving pulley 72. Rotation of shaft 71 may be controlled in the usual manner by a clutch or the like (not shown). Shaft 51 has a pulley 76 secured thereon in alinment with tractor mounted pulleys 72, 73 and 74 and is driven from pulley 72 by means of a belt 77 which passes around pulley 76, over pulley 72, under pulley 73 and over pulley 74. Pulleys 72 and 74 and the common axis of the alined rear pivot pins 8 and 9 are preferably so related that the belt tension remains substantially uniform as the forward ends of members 6 and 7 and thereby the cutter heads 3 and 4 and shaft 51 are raised and lowered relative to the tractor mounted stalk gathering and ear removing mechanisms. In addition, the direction of rotation of shaft 51 should be such that the blades on cutter head 4 rotate in a counter clockwise direction when viewed as seen in Fig. 1. The blades on cutter head 5 will of course rotate in an opposite or clockwise direction, and in this connection, it should be noted that the relation of the cutting blades 61 and fingers 62 is such that the toppings, i. e., the portion of the stalks cut off by the blades, are immediately engaged by the following fingers 62 and projected away from the tractor and out of the path of the stalk gathering and ear removing mechanisms.

If, for any reason, belt 77 should become too loose, bolts 43 may be loosened and the brackets 39 and 41 adjusted forwardly along members 6 and 7 until the desired belt tension is obtained, whereupon bolts 43 can be retightened to retain the brackets in their adjusted positions. If desired, the cutting blades may be retained in a substantially horizontal position during cutting operations irrespective of the position of members 6 and 7 simply by loosening bolts 47 securing gear housings 44 and 46 to brackets 39 and 41 and simultaneously rotating the housings in the appropriate direction as permitted by the arcuate nature of slot 48 which is so related relative to shaft 51, relative to pulleys 72, 73 and 74, and relative to rear pivot pins 8 and 9 that the tension of drive belt 77 is not affected by a tilting of the gear housings. Moreover, since the shafts 51 and 54 are entirely supported by the housings 44 and 46, an angular movement of such housings about the coaxially alined pivots provided by one of each pair of bolts 47 in no manner effects the meshing relation of gears 52 and 56.

It should now be obvious that the apparatus herein disclosed for purposes of illustration comprises a power operated stalk severing device mounted for movement with the corn harvester in operative stalk topping relation with respect to standing corn in the path of the stalk gathering and ear removing mechanism, that apparatus embodying the invention is applicable to all types of traveling corn harvesters irrespective of whether they are one or multiple row types and irrespective of whether they are mounted on a tractor or on any other means which is propelled, drawn or pushed through a field of standing corn, and that it is not desired to limit the invention to the exact construction and arrangements of parts herein disclosed, as various modifications within the scope of the appended claims may occur to persons skilled in the art.

It is claimed and desired to secure by Letters Patent:

1. In a tractor supported, power operated corn harvester embodying mechanism extending forwardly along one side of the tractor for gathering in the stalks and removing the ears therefrom, a stalk topping apparatus comprising a substantially rigid, elongated member, means including a rear pivot mounting detachably supporting said member on said tractor in forwardly extending relation above said mechanism and for vertical swinging movement about said rear pivot mounting, means including a part extending rearwardly to a point within reach of the tractor operator for effecting a vertical swinging movement of said member and for retaining same in a selected position, a stalk severing device operatively supported on the forward end of said member for movement therewith and including a rotary stalk cutter, a shield enclosing the rear portion of said cutter, means for raising and diverting bent-over stalks into the path of the cutter, and additional means for moving the severed top portions of the stalks out of the path of said mechanism, a rotating power transmitting element carried by said tractor in adjacent, fixed relation with respect to said rear pivot mounting, and means operatively connecting said power transmitting element with said rotary cutter.

2. In a tractor supported, two row, power operated corn harvester embodying mechanism extending forwardly along each side of the tractor for gathering in the stalks and removing the ears therefrom, a stalk topping apparatus comprising a pair of substantially rigid, elongated members, means including a pair of rear pivot mountings detachably supporting said members on opposite sides of said tractor in forwardly extending relation above said mechanisms and for vertical swinging movement about said rear pivot mountings, means uniting said members for simultaneous swinging movement and including a handle extending rearwardly to a point within reach of the tractor operator for effecting a vertical swinging movement of said members and for retaining same in a selected position, a stalk severing device operatively supported on the forward end of each member and including a shaft element mounted for rotation about a vertically extending axis, a stalk cutting blade secured to the lower end of said shaft element so as to project radially outward therefrom, a topped stalk removing finger secured to the lower end of said shaft element so as to project radially outward therefrom in overlying angularly displaced relation with respect to the stalk cutting blade, a power transmitting means carried by said members and connecting said shaft elements for simultaneous rotation in opposite directions, and means for driving said power transmitting means to rotate said shaft elements with each stalk cutting blade disposed in leading relation with respect to the associated topped stalk removing finger and in such directions that the topped stalk removing fingers act to project the toppings laterally outward from the adjacent side of said tractor.

3. In a traveling corn harvester including a power source and a mechanism for gathering in standing stalks and removing the ears therefrom while the stalks remain rooted in the ground, a stalk topping apparatus comprising a supporting means, a stalk severing device carried by the forward end of said supporting means in forward elevated relation to said mechanism, and means operatively connecting said severing device with said power source.

4. In a traveling corn harvester including a power source and a mechanism for gathering in standing stalks and removing the ears therefrom while the stalks remain rooted in the ground, a stalk topping apparatus comprising a vertically adjustable supporting means, a stalk severing device carried by the forward end of said supporting means in forward elevated relation to said mechanism, means operatively connecting said severing device with said power source, and an additional device carried by said supporting means for raising and diverting bent over stalks into the path of said severing device, said supporting means including means for vertically positioning said severing device and said additional device at the same time.

5. In a traveling corn harvester including a power source and mechanism extending generally in the direction of travel for gathering in standing stalks and removing the ears therefrom while the stalks remain rooted in the ground, a power driven stalk topping apparatus comprising an elongated rigid member disposed above said mechanism and extending generally in the direction of harvester travel, said member being supported for vertical swinging movement toward or away from the front end of said mechanism by means including a rear pivot mounting and additional parts for selectively adjusting the elevation of the forward end of said member, a stalk severing device mounted on said member in forwardly disposed relation with respect to the underlying front end of said mechanism, and means operatively connecting said severing device with said power source.

6. In a tractor mounted power operated corn harvester including mechanism extending generally longitudinally of the tractor for gathering in standing stalks and removing the ears therefrom, a stalk topping apparatus carried by said tractor and comprising an elongated rigid member extending generally longitudinally of said tractor and supported thereon for vertical swinging movement by means including a rear pivot mounting and additional parts for effecting a vertical swinging movement of said member and for retaining same in a selected position, a rotary stalk severing device carried by the forward end portion of said member in forwardly disposed elevated relation with respect to the front end of said mechanism, a rotating power transmitting element carried by said tractor in adjacent fixed relation with respect to said rear pivot mounting, and an endless means operatively connecting said power transmitting element with said rotary stalk severing device.

7. In a traveling harvester embodying mechanism for gathering in stalks, a stalk topping apparatus comprising a shaft element suspended for rotation about a vertically extending axis and for movement with said harvester by a supporting means vertically adjustable relative to said harvester for positioning the lower free end of said element in forwardly disposed elevated relation with respect to the front end of said mechanism, a stalk cutting blade secured to the free end of said element so as to project radially outward therefrom, a stalk topping removing finger secured to the free end of said element so as to project radially outward therefrom in overlying angularly displaced relation with respect to said stalk cutting blade, and means for rotating said element with said stalk cutting blade disposed in leading relation with respect to said stalk topping removing finger.

8. In a traveling, power operated harvester embodying mechanism for gathering in stalks, a stalk topping apparatus comprising a substantially rigid, elongated member, means including a pivot mounting supporting the rear end of said member for movement with said harvester in forwardly extending relation above said mechanism and for vertical swinging movement about said pivot mounting, means including a rearwardly extending, remotely actuated handle for effecting a vertical swinging movement of said member and for retaining same in a selected position, a rotating stalk cutting device, means mounting said device on the forward end of said member for movement therewith and for rotation about a vertically extending axis, said mounting means including relatively movable parts for maintaining the axis of said device in a vertical position as said member is swung vertically about its rear pivot mounting, a rotatable power transmitting element mounted adjacent and in fixed relation to said rear pivot mounting, and means operatively connecting said power transmitting element with said rotating cutting device.

9. In a traveling harvester including a power source and a mechanism for gathering in standing stalks, a stalking topping apparatus comprising a supporting means, a rotary stalk severing device carried by said supporting means in forwardly disposed elevated relation with respect to the front end of said mechanism, a finger mounted on a rotating shaft element of said severing device in a position to engage and forcibly project stalk toppings laterally relative to the direction of harvester travel and out of the path of said mechanism, and means operatively connecting said severing device with said power source.

10. In a traveling harvester including a power source and a mechanism for gathering in standing stalks, a stalk topping apparatus comprising a supporting means pivotally mounted for angular vertical adjustment, a stalk severing device mounted on said supporting means for rotation about a vertically extending axis and in forwardly disposed elevated relation with respect to the front end of said mechanism, said supporting means including relatively movable parts coacting to maintain the axis of said severing device substantially vertical as the supporting means is angularly adjusted to raise or lower said severing device, and means operatively connecting said severing device with said power source.

11. In a traveling harvester including a power source and mechanism for gathering in stalks, a stalk topping apparatus comprising a shaft element suspended for rotation about a vertically extending axis and for movement with said harvester by a supporting means vertically adjustable relative to said harvester for positioning the lower free end of said shaft element in forwardly disposed elevated relation with respect to the front end of said mechanism, a stalk cutting blade secured to the free end of said shaft element so as to project radially outward therefrom, a stalk topping removing finger secured to the free end of said element so as to project radially outward therefrom in overlying angularly displaced relation with respect to said stalk cutting blade, and means operatively connecting said power source with said stalk topping apparatus for rotating said element with said stalk cutting blade disposed in leading relation with respect to said stalk topping removing finger, said finger being so positioned in reference to said blade to engage and forcibly project stalk toppings laterally relative to the direction of harvester travel and out of the path of said mechanism.

12. In a traveling corn harvester including a power source and a mechanism for gathering in standing stalks and removing the ears therefrom while the stalks remain rooted in the ground, a stalk topping apparatus comprising a supporting means, a stalk severing device carried by said supporting means in forward elevated relation to said mechanism, and means operatively connecting said severing device with said power source.

RECTOR C. FERGASON.

REFERENCES CITED

The following references are of record in the file of this patent:

UNITED STATES PATENTS

| Number | Name | Date |
|---|---|---|
| 24,487 | Phillipp | June 21, 1859 |
| 196,598 | Seitz | Oct. 30, 1877 |
| 815,437 | Knox | Mar. 20, 1906 |
| 1,383,833 | Lyman | July 5, 1921 |
| 1,457,827 | Erb | June 5, 1923 |
| 1,666,818 | Fisher | Apr. 17, 1928 |
| 1,714,272 | Luce | May 21, 1929 |
| 1,821,985 | Peterson | Sept. 8, 1931 |
| 2,340,084 | Scranton | Jan. 25, 1944 |
| 2,380,161 | Flook | July 10, 1945 |

FOREIGN PATENTS

| Number | Country | Date |
|---|---|---|
| 12,940 of 1928 | Australia | June 19, 1929 |